United States Patent [19]
Barbieux

[11] Patent Number: 5,605,343
[45] Date of Patent: Feb. 25, 1997

[54] GRIPPING JAW

[75] Inventor: Jacques Barbieux, Louvres, France

[73] Assignee: Sandvik Tobler S.A., Louvres, France

[21] Appl. No.: 474,381

[22] Filed: Jun. 7, 1995

[30] Foreign Application Priority Data

Jun. 7, 1994 [FR] France .................................. 94 06935

[51] Int. Cl.⁶ ........................................... B23B 31/18
[52] U.S. Cl. .......................................... 279/132; 279/106
[58] Field of Search .................................. 279/106–109, 279/132

[56] References Cited

U.S. PATENT DOCUMENTS

| | | | |
|---|---|---|---|
| 3,069,181 | 12/1962 | Hohwart et al. | 279/106 |
| 3,365,206 | 1/1968 | Hohwart et al. | 279/106 |
| 4,570,950 | 2/1986 | Morawski et al. | 279/132 |
| 5,184,833 | 2/1993 | Cross et al. | 279/132 |

FOREIGN PATENT DOCUMENTS

| | | |
|---|---|---|
| 251266 | 1/1988 | European Pat. Off. . |
| 2373351 | 7/1978 | France . |
| 1502035 | 10/1969 | Germany . |

*Primary Examiner*—Steven C. Bishop
*Attorney, Agent, or Firm*—Burns, Doane, Swecker & Mathis LLP

[57] ABSTRACT

This invention relates to a gripping jaw (1) comprising: a body (4); a traction rod (6) sliding axially in the body (4); at least one jaw holder (3) sliding radially in the body (4); and a transmission system (7,8) converting axial translation of the traction rod (6) into the radial translation of each jaw holder (3). Each jaw holder (3) is fitted with a guiding member (10) guided radially along a groove (14) recessed within the chuck (1), the member being uniquely free to swivel axially in relation to the jaw holder.

6 Claims, 2 Drawing Sheets

GRIPPING JAW

BACKGROUND OF THE INVENTION

This invention relates to a gripping jaw. FR-A-2 373 351 discloses a chuck in the body of which there slides axially a traction rod that acts on a transmission system which converts the axial translation of this rod into a radial translation in terms of each jaw holder. These latter are provided with lateral flat bars which interact with flat bars recessed in the body in such a fashion as to guide the radial sliding of the jaw holders.

By means of this contrivance, the transmission of the clamping force of the rod on the jaws is exerted through inclined faces, and the distribution of the force is the same on each jaw. This generally satisfactory system can however present a drawback associated with the statically overdefined character of the clamping thus obtained. In fact, each jaw holder can swivel axially only very slightly, which means that the jaws are often only imperfectly moulded to the shape of the piece they are required to chuck.

Thus, in the case of components such as brake drums and disks, beating rings, flanges, flywheels or wheels, such a statically overdefined clamping can lead to appreciable deformations—which is unacceptable for precision pieces the dimensions of which are subjected to very exacting tolerances.

OBJECTS AND SUMMARY

In order to overcome these drawbacks, an object of the invention is a chuck providing a precise radial guidance of the jaw holders in the body of the chuck and, in addition, providing freedom of axial swivelling of the latter in order to obtain optimal positioning of the jaws in contact with the piece to be chucked.

To this effect, the invention more specifically relates to a gripping jaw having:
  a body
  a traction rod sliding axially within the said body
  at least one jaw holder sliding radially within the said body
  a transmission system convening axial translation of the traction rod into the radial translation of each jaw holder,
  a chuck in which each jaw holder is fitted with a guiding member guided radially along a groove recessed in the chuck, the said guiding member being uniquely free to swivel axially in relation to the jaw holder.

The addition of this member thus enables the aforesaid objectives to be achieved by providing precise radial guidance of the jaw holder and enabling the latter to swivel on its axis.

BRIEF DESCRIPTION OF THE DRAWINGS

Other advantages and features will become apparent when reading the description of a particular mode of embodiment of the invention, made with reference to the annexed drawings, in which.

DETAILED DESCRIPTION OF THE PREFERRED EMBODIMENTS

Figures 1, 2, 3:
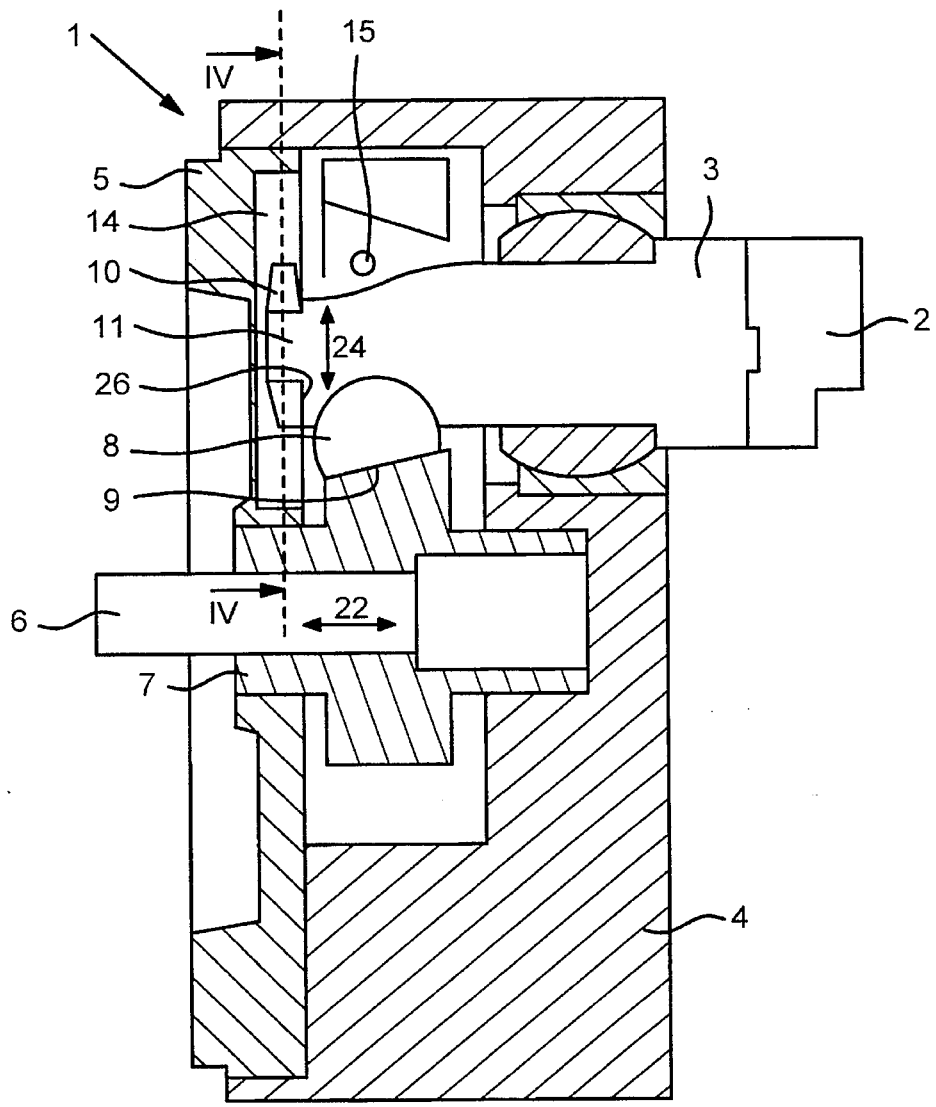
FIG. 1 is a representation of a chuck corresponding to the invention, and comprising three jaws, according to a section passing through the axis of the body and a jaw holder.
FIG. 2 is an enlargement of a part of FIG. 1.
FIG. 3 is the front view of a guiding flange corresponding to the invention.

As shown in FIG. 1, this invention relates to a chuck designated as a unit by the reference 1, and which is furnished with three jaws 2 respectively spaced at angles of 120°, each mounted on a jaw holder 3. The chuck comprises a body 4 at the rear of which is fixed a plate 5, and in which a traction rod 6 is able to slide axially as shown by arrow 22 to force and end 26 of the jaw holder 3 into radial translation as shown by arrow 24. The transmission of the motion is effected by means of a transmission system comprising a plate cam 7 and a bearing part 8. The plate cam is mounted on the traction rod 6 and presents a flat and somewhat oblique, lower, beating surface 9. The bearing part 8 consists of a truncated spherule presenting a flat surface interacting with the bearing face 9 of the plate cam. This spherule 8 is housed in a scalloped recess in the jaw holder 3.

As FIGS. 2 and 3 show more precisely, a guiding flange 10 performing the function of a guiding member, is slidingly arranged around the journal 11 of the jaw holder.

Figure 4:
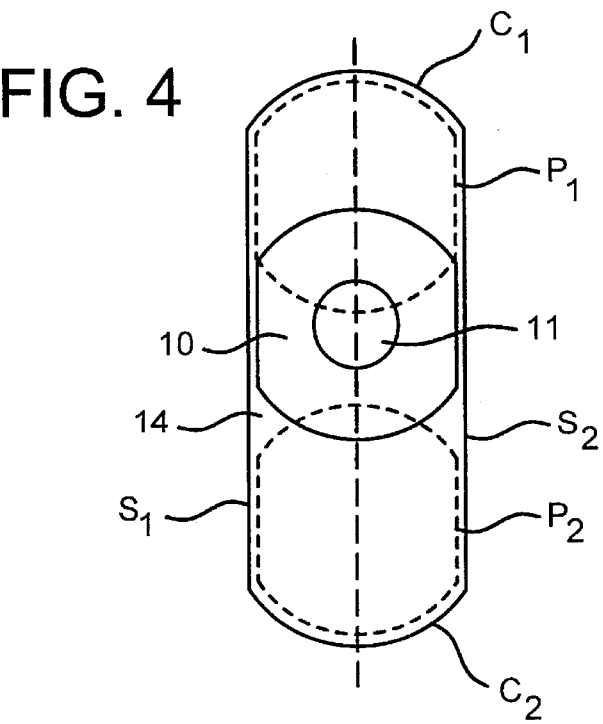
FIG. 4 is a detail in cross section according to line IV—IV in FIG. 1.

To this effect, this flange 10 consists of a thin disk 12 presenting a cavity 13 at its center, the dimensioning of which corresponds to those of the journal 11. The flange is moreover truncated from the front view according to two parallel planes $D_1$ AND $D_2$ and, in cross section, presents three faces ($F_1$, $F_2$, $F_3$) in relief, i.e., the three faces $F_1$, $F_2$, $F_3$ are inclined relative to the plane of the disc 12. A groove 14, recessed in the plate 5 fixed at the rear of the body 4 of the chuck 1, extends axially a little beyond the extremity of the flange 10 opposite the location of the jaws 2. Viewed from the front, as shown in FIG. 4, this groove consists of two portions of circle $C_1$ and $C_2$, so that the surface defined by the groove corresponds to the travel of the flange between the two extreme positions $P_1$ and $P_2$.

In this way, during radial translation of the end 26 of the jaw holder 3 in the direction of arrow 24, the flange 10 travels inside the groove 14, and thus provides radial guidance of the jaw holder 3. In addition, the biter being free to swivel in relation to the flange 10, each jaw 2 is itself able to swivel axially, in order to best adapt to the surface of the piece to be held, which avoids statically overdefined clamping.

The repositioning of the jaw holder 3 in the unclamped position is effected by means of a return shaft 15 which bounds the motion of the jaw holder 3 as shown in FIG. 1. In the unclamped position, there is minimal play between the jaw holder and the shaft, their contact surface being flat.

Figure 5:
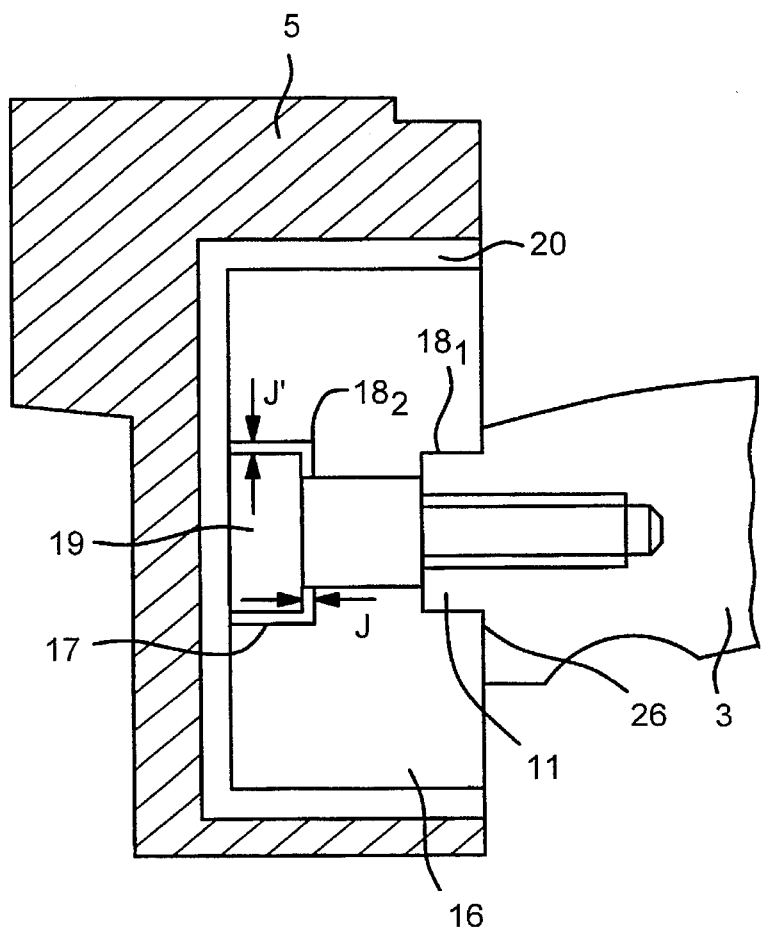
FIG. 5 represents a variant embodiment of the invention.

In the eventuality of the centrifugal effect being offset by the flange 10, it would be possible for the journal 11 of the jaw holder 3 to be fitted with a block 16, as shown in FIG. 5. From the front view, this latter presents a conformation similar to that of the flange 10. On the other hand, to increase its mass, it possesses much larger axial dimensions, so that it extends beyond the extremity of the journal opposite the jaw holder.

A through cavity 17 is recessed in the block 16, so that the internal surface 18 of the block 16 comprises a portion $18_1$ designed to interact with the journal 11 of the jaw holder 3, and a portion $18_2$ allowing the passage of fixing means 19. These latter are necessary to prevent the block from becoming detached from the jaw holder 3. Nevertheless, it is preferable for them to be axial play J and J' between the internal surface 18 of the block and the fixing means 19, in order to allow better swivelling of the of the jaw holder in relation to the block.

During radial translations of the end 26 of the jaw holder, the block 16 is able to be translated in the groove 20 recessed in the chuck. Just as in the case of the block 10 described previously, the groove 20 extends axially a little beyond the extremity of the block, and presents, from the front view, a conformation which enables the block to be guided between a high position and low position.

I claim:

1. A chuck comprising:

a body;

a traction rod sliding axially in the body;

at least one jaw holder having an end which slides radially in the body; and a transmission system converting axial translation of the traction rod into radial translation of the end of each jaw holder, the jaw holder is fitted with a guiding member guided radially along a groove recessed within the chuck, the guiding member being free to swivel axially in relation to the jaw holder.

2. The chuck as claimed in claim 1, wherein the jaw holder includes a journal; and the guiding member is a block slidingly arranged on the journal of the jaw holder.

3. The chuck as claimed in claim 2, wherein the block comprises a thin disk truncated by two parallel planes, and having a central cavity the dimensions of which cavity correspond with dimensions of the jaw-holder journal.

4. The chuck as claimed in claim 3, wherein the block presents in cross section at least one face in relief.

5. The chuck as claimed in claim 2, further comprising a fixing means, wherein the guiding member is a block which extends axially beyond the journal and is held onto the jaw holder by the fixing means.

6. The chuck as claimed in claim 5, wherein the block and the fixing means are formed such that there is axial and radial play between an internal surface of the block and the fixing means.

* * * * *